United States Patent [19]

Nakano

[11] 4,259,695

[45] Mar. 31, 1981

[54] FACSIMILE SHEET CLAMPING DEVICE

[75] Inventor: Ryunosuke Nakano, Yokohama, Japan

[73] Assignee: Matsushita Graphic Communication Systems, Inc., Tokyo, Japan

[21] Appl. No.: 99,485

[22] Filed: Dec. 3, 1979

[51] Int. Cl.³ .................. H04N 1/08; G01D 15/14; B65H 5/04; B41L 11/00

[52] U.S. Cl. .................................. 358/291; 346/138; 101/415.1; 271/277

[58] Field of Search .................... 358/291; 346/138; 101/415.1; 271/277

[56] References Cited

U.S. PATENT DOCUMENTS

| | | | |
|---|---|---|---|
| 3,618,123 | 11/1971 | Buddendeck | 358/291 |
| 4,056,829 | 11/1977 | Ikeda | 358/291 |
| 4,135,198 | 1/1979 | Fujimoto | 358/291 |

*Primary Examiner*—Robert L. Griffin
*Assistant Examiner*—Edward L. Coles
*Attorney, Agent, or Firm*—Stevens, Davis, Miller & Mosher

[57] ABSTRACT

A facsimile device of a type having a rotary drum and clamping bars movable toward and away from the drum surface to cooperate, when moved toward the drum surface, together with the drum surface in clamping therebetween the leading and trailing ends of a sheet. The device has a combination of electric and mechanical means adapted to control the movements of the first and the second clamping bars in response to the manual opening and closing action of a manually operable drum cover or the like member, such that, as the drum cover or the like is moved to the closing position, the sheet placed at a predetermined position is automatically picked up and wound around the drum and, as the drum cover or the like member is moved to the opening position, the sheet is automatically released and returned to the predetermined position.

3 Claims, 15 Drawing Figures

FACSIMILE SHEET CLAMPING DEVICE

BACKGROUND OF THE INVENTION

The present invention relates to a drum scanning type facsimile device having a function of automatically attaching the image bearing sheet such as manuscript sheet or recording sheet.

A facsimile device is known in which the image bearing sheet, which will be refered solely to "the sheet", is fixed at its leading and training sides to the drum by means of fixing bars. This type of facsimile device which is usually referred to as single-sheet type or simplified type facsimile, has no function for automatically attaching and detaching successive stacked sheets. In operation of this type of facsimile device, the attaching and detaching of sheets has to be made wholly manually by the steps of at first opening a drum cover of the housing of the device, rotating the drum and then fixing or releasing the sheet to and from the drum.

Recently, there has been proposed a singlesheet or simplified type facsimile device in which the attaching and detaching of the sheet is made automatically. However, manual works such as depression of a push button is still required, besides the opening of the drum cover by hand, even in this automatic facsimile device.

Current popularization of the facsimile device gives a rise to a demand for an easier attaching and detaching of the sheet, even in case of the simplified less-expensive device.

SUMMARY OF THE INVENTION

It is, therefore, a major object of the invention to provide a facsimile device which permits an easier attaching and detaching of the sheet to and from the drum.

To this end, according to the invention, there is provided a facsimile device in which the attaching and detaching of the sheet is performed automatically in such a manner that, once a drum cover or the like is closed manually, the sheet is automatically picked up from a predetermined position and wound round the drum, and, once the drum cover or the like is opened, the sheet is automatically detached from the drum and returned to the predetermined position.

More specifically, the present invention provides a facsimile device having a drum mounted rotatably, and a first and a second bars movable into and out of contact with the surface of the drum so as to clamp, when in contact with the drum surface, both ends of a sheet wound round the drum, characterized by comprising a combination of mechanical means and electric means which are adapted to control the operation of the first and second bars in response to the opening and closing motion of a manually operable drum cover or the like means, whereby a sheet placed at a predetermined position is automatically wound round and fixed to the drum solely by the closing motion of the cover or the like means and the sheet is automatically released solely by the opening motion of the same.

These and other objects, as well as advantageous features of the invention will become more clear from the following description of the preferred embodiments taken in conjunction with the accompanying drawings.

DESCRIPTION OF THE PREFERRED EMBODIMENTS

Figure 1:
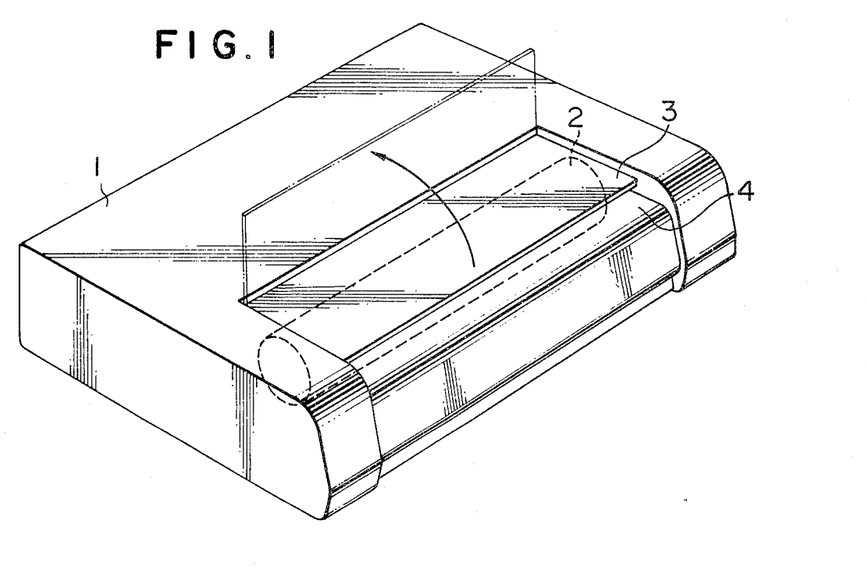
FIG. 1 is a schematic perspective view of a facsimile device embodying the present invention.

Referring first to FIG. 1 schematically showing a facsimile device embodying the present invention, the facsimile device has a housing 1 covering the entire portion of the device. A drum 2 is installed in the housing 1. A drum cover 3 is adapted to be swung in the direction of arrow, between a closing position shown by full line and an opening position shown by two-dots-and-dash line. A table 4 for mounting the sheets plays also the role of a front cover of the facsimile device. The drum 2 becomes accessible to permit the attaching and detaching of the sheet, as the drum cover 3 is opened.

Figure 2:
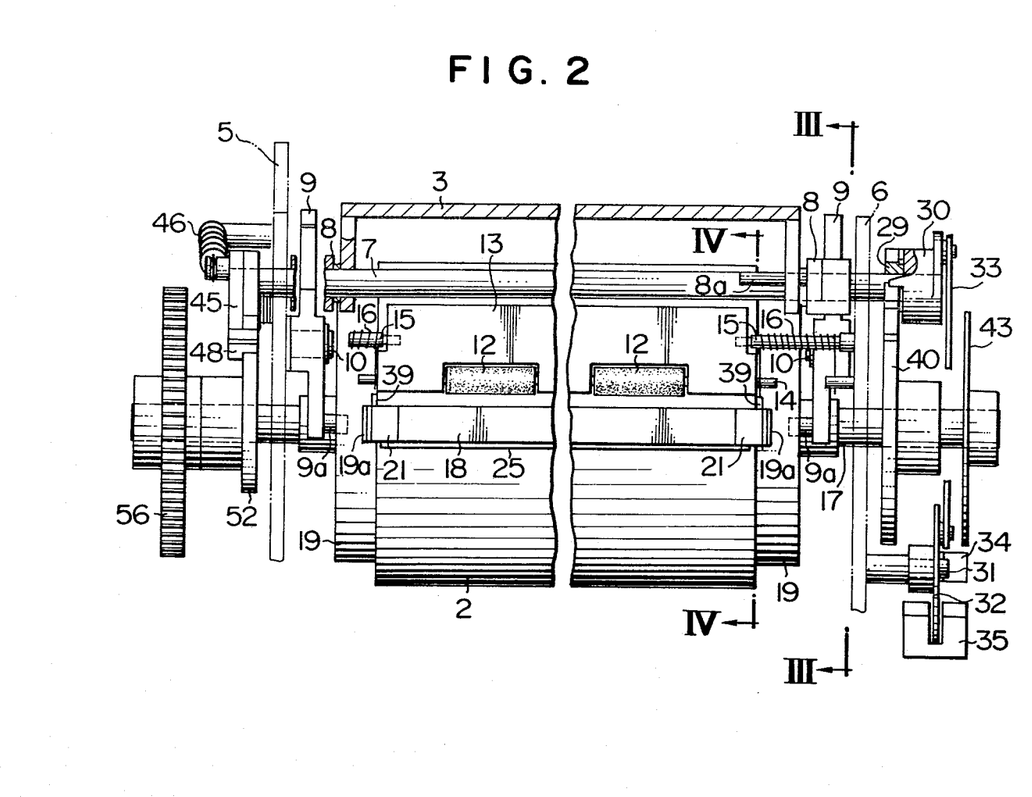
FIG. 2 is a plan view of an essential part of the facsimile device including a drum and associated members.
Figure 3:
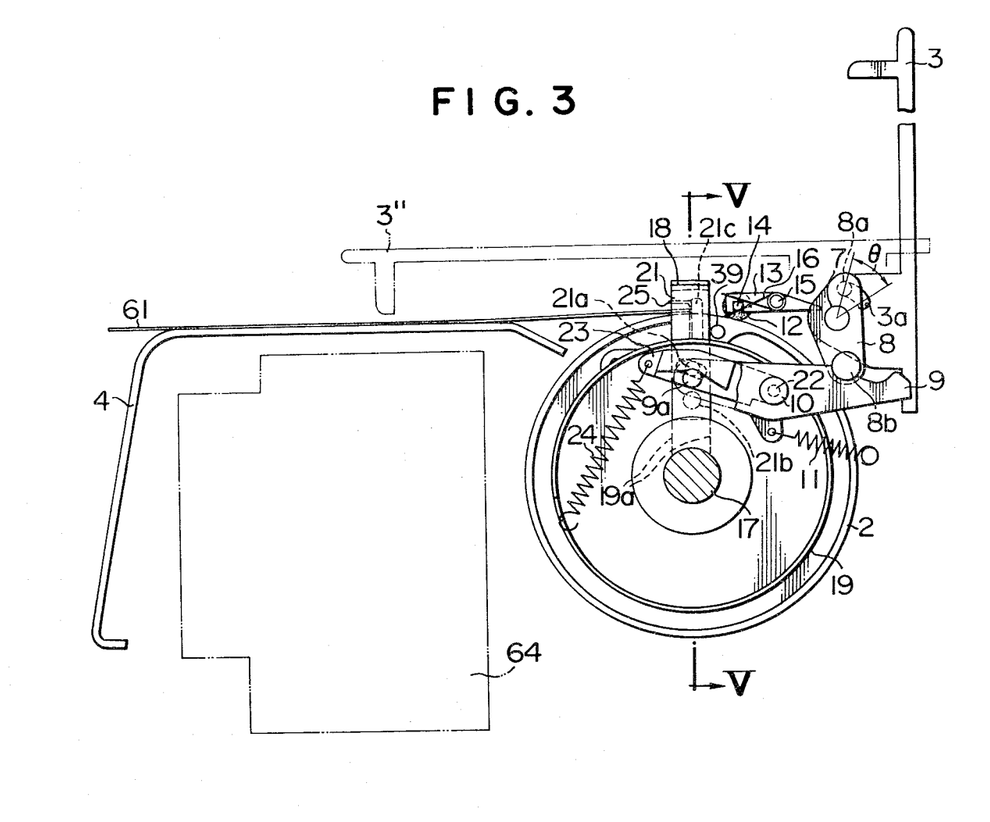
FIG. 3 is a sectional view taken along the line III—III of FIG. 2.
Figure 4:
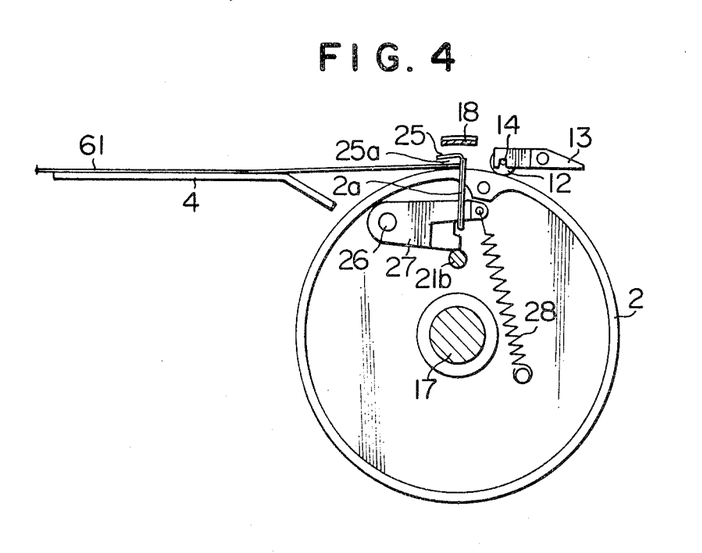
FIG. 4 is a sectional view taken along the line IV—IV of FIG. 2.
Figure 5:
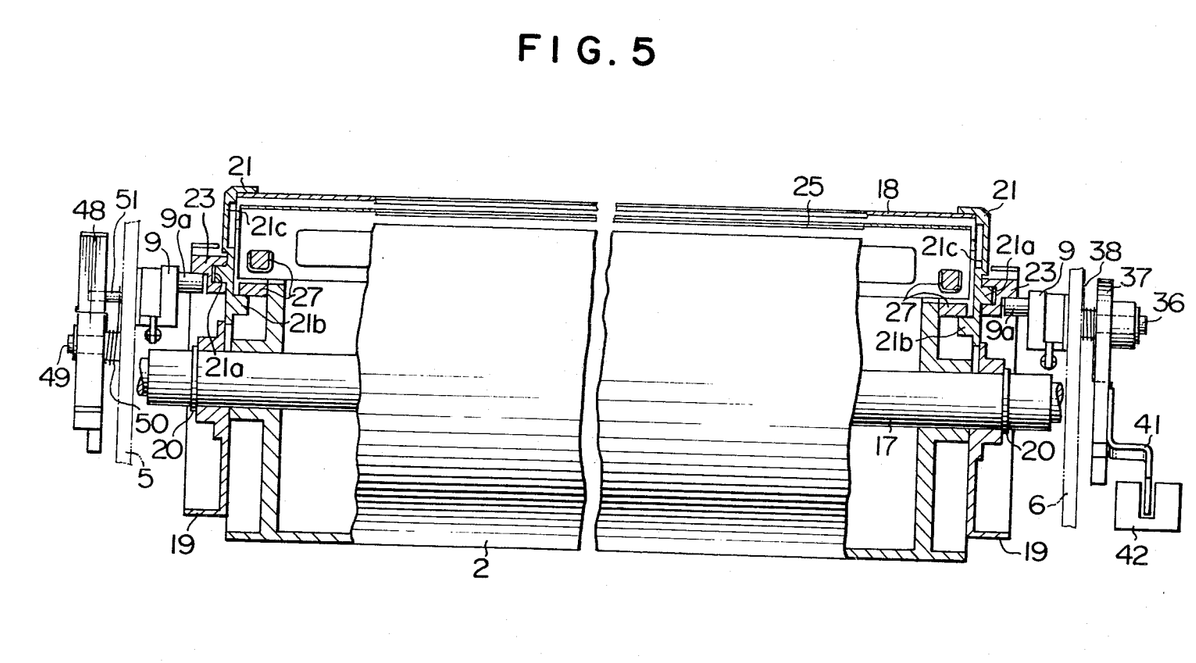
FIG. 5 is a front elevational view of the drum and other essential parts with both ends of the drum being shown in section taken along the line V—V of FIG. 3.
Figure 6:
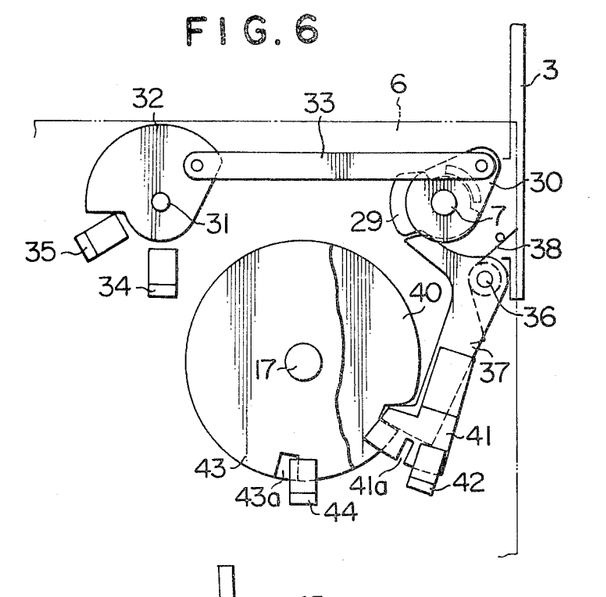
FIG. 6 is a right side elevational view of the drum and other members shown in FIG. 2.
Figure 7:
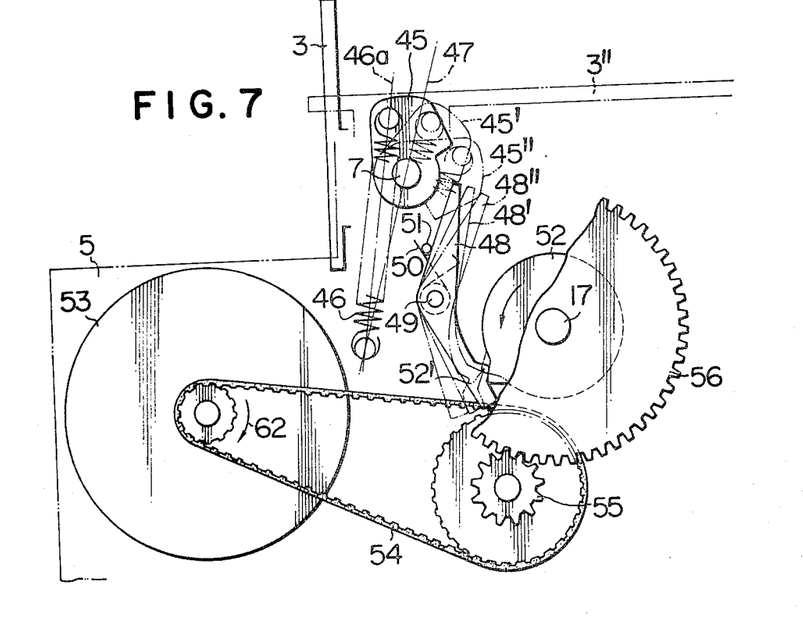
FIG. 7 is a left side elevational view of the drum and other members shown in FIG. 2.

FIGS. 2 to 7 show the essential parts of the facsimile device in the so-called stand-by state ready for the sheet supply. More specifically, FIG. 2 is a plan view of the drum and the associated essential parts. FIGS. 3 and 4 are sectional views taken along the lines III—III and IV—IV of FIG. 2, respectively. FIG. 5 is a front elevational view of the drum and other essential parts with both ends of the drum being shown in section taken along the line V—V of FIG. 3. FIGS. 6 and 7 are right and left side elevational views of the drum and associated members shown in FIG. 2.

Referring first to FIGS. 2 and 3, a shaft 7 rotatably carrying the drum cover 3 is supported also rotatably by left and right walls 5, 6. The drum cover 3 is shown in a state swung around the shaft 7 to the opening position. Arms 8 having pins 8a, 8b fixed thereto are attached to the shaft 7 at both sides of the drum cover 3. The pins 8a, 8b are passed through arcuate elongated apertures formed in both side walls of the drum cover 3. A play angle θ is preserved between the pin 3a and the aperture 3a.

The opening and closing motion of the drum cover 3 is transmitted through the elongated apertures 3a, the pin 8a and the arm 8 to the shaft 7 to rotate the latter in the same direction as the movement of the drum cover 3. The other pin 8b acts on bar-actuating levers 9 which are mounted symmetrically on shafts 10 fixed to the left and right side walls 5, 6, respectively, and are biased counter-clockwise by means of springs 11. In the drawings referred to in the above description, members such as arms 8, bar-actuating levers 9 and so forth which are provivided in pairs and arranged at both sides in symmetry are designated at identical reference numerals, as is the case of the following description.

As will be described later, a plurality of pinch rollers 12 rotatably mounted on a shaft 14 fixed to a bracket 13 are adapted to play a double role of putting the sheet into close contact with the drum surface when the sheet is wound round the drum and guiding the released sheet when the latter is detached from the drum. The brackets 13 are rotatably carried by pins 15 which are respectively fixed to the left and right walls 5, 6, and are biased by springs 16 in such a direction that the pinch rollers 12 press the outer peripheral surface of the drum. Also, the drum 2 is fixedly mounted on a drum shaft 17 which in turn is rotatably carried by both walls 5, 6.

Referring now to FIG. 5, retainers 19 for bars 18 are rotatably secured to the drum shaft 17, in contact with respective axial ends of the drum 2. These retainers are prevented from moving in the axial direction by means of stopper rings 20. The bar 18 is an elongated leaf spring for clamping the trailing end of the sheet and having a channel-like cross-section. The bar 18 has a length slightly greater than the overall axial length of the drum 2 so as to be supported at its both ends by brackets 21.

It is often experienced in the conventional facsimile device that the clamping force is weakened at the portion near the lengthwise mid point of the bar 18. In order to avoid this, the bar 18 is so designed to have such a deflection that the mid portion of the bar 18 is positioned closer to the drum than other portions. Each bracket 21 is fitted to a groove 19a formed in the corresponding retainer 19, and is allowed to move along the groove 19a, i.e. in the direction normal to the drum 2. A pin 21a is formed unitarily with each bracket 21. The pin 21a is adapted to receive the force of a spring 24 transmitted through a lever 23 which is secured to the retainer 19 for free rotation around a shaft 24. In consequence, the bracket 21 is always biased toward the center of the drum 2. However, the bar 18 is held at a certain space from the drum surface, because the arm 23 is retained by the pin 9a of the bar-actuating lever 9.

In this state, a pin 39 fixed to the each side surface of the drum 21 is in abutment with the side edge of the bracket 21, which in turn holds the bar 18 in this position until the drum 2 is rotated, in cooperation with the retaining action performed by the pin 9a. A groove 21c having a later-described function is formed in the drum-side surface of each bracket 21.

Referring to FIG. 4, a bar 25 having a hook-like cross-section and adapted for clamping the leading end of the sheet has a length somewhat smaller than the overall axial length of the drum 2, and is received by a groove 2a formed over the entire length of the drum 2, for free movement in the direction normal to the latter. Forces of springs 28 are applied to both ends of the bar 25 through arms 27 which are secured to the side surfaces of the drum for rotation around the shafts 26, so that the bar 25 is always biased toward the center of the drum 3. In this state, however, the bar 25 is spaced from the drum surface leaving a gap 25a therebetween because the arms 27 are retained by the pins 21a unitary with the brackets 21.

Referring also to FIG. 6, a cam 29 is loosely fitted to the shaft 7 on the outside of the right wall 6 for free rotation. A dog 30 fixed to the shaft 7 is adapted to transmit the rotation of the shaft 7 caused by opening and closing motion of the drum cover 3 to the cam 29. A shutter 32 is rotatably carried by a shaft 31 which is fixed to the right side wall 6. The rotation of the dog 30 is transmitted to the shutter 32 by means of a link 33 thereby to open and close the path of light beams for sensors 34 and 35. A drum stop lever 37 is rotatably carried by a shaft 36 which in turn is fixed to the right wall 6. This drum stopper lever 37 is biased clockwise by means of the spring 38 so as to be into engagement with a recess of a drum stop cam 40 which is fixed to the drum shaft 17, thereby to retain the latter. Therefore, the drum 2 is held in a constant position, i.e. in the state in which the bar 25 is spaced from the drum.

As will be described later, the drum stop lever 37 operates in response to the angular displacement of the cam 29 so as to release the drum stopper cam 40 and, at the same time, to open and close a sensor 42 by means of a shutter 41. Another shutter 43 provided with a notch 43a is fixed to the drum shaft 17, and is adapted to actuate a sensor 44 as will be described later.

Referring also to FIG. 7, a cam 45 is fixed to the shaft 7 on the outside of the leftside wall 5. A spring 46 is attached such that its axis 46a is displaced when the cam 45 is rotated through the shaft 7 as a result of the opening and closing motion of the drum cover 3, and is adapted to impart to the cam 45, i.e. to the shaft 7, a snapping action on each side of a dead point.

A kicker lever 48 is rotatably carried by the shaft 49 which is fixed to the left wall 5, and is biased counterclockwise by means of a spring 50. However, the kicker lever 48 is stopped at this position by means of a stopper pin 51 which is fixed to the leftside wall 5. As will be described later, a kicker cam 52 fixed to the drum shaft 17 acts on the kicker lever under a certain condition.

The drum shaft 17 is adapted to be driven by a motor 53 which is an A.C. synchronous motor, through a timing belt 54 and gears 55, 56.

Hereinafter, a description will be made as to the interlocked operation between the sensors 34, 35, 42, 44 and the control circuit with specific reference to FIG. 8. Sensors 34, 35, 42 and 44 are small-sized photo-interrupters adapted to produce outputs corresponding to the opening and closing of the light paths formed therein. In the described embodiment, the turning on and off, or switching of various parts of the circuit described below are effected by means of the outputs from these sensors. The opening and closing of the sensor 34 (sensor 34 is shown in the opened state in FIG. 6) turns a relay 59 on and off through the opening and closing of a switching circuit 34'. The opening and closing action of the sensor 35 (sensor 35 is shown in the opened state in FIG. 6) causes a switching of a switching circuit 35' for changing the rotational direction of the motor 53 between the forward the reverse positions. The opening and closing motion of the sensor 42 (sensor 42 is shown in the opened state in FIG. 6) causes an opening and closing of a switching circuit 42', thereby to turn on and off the driving circuit for the motor 53. Further, the opening and closing motion of the sensor 44 (sensor 44 is shown in the closed state in FIG. 6) causes an opening and closing of a switching circuit 44' thereby to turn a relay 59 on and off. The relay 59 has a contact 59a which is adapted to make a contact with terminals 59' and 59'' in the "on" and "off" state of the relay 59.

A reference numeral 57 denotes a control circuit for controlling the rotational speed to the drum 2. This control circuit is adapted to control the frequency of the electric power supply to switch the rotational speed of the drum such that the drum is rotated at the main scanning speed during the communication and is decelerated to a low speed for permitting the detaching and attaching of the sheet immediately after the completion of the communication.

A reference numeral 58 denotes a control circuit which is adapted to close a switching circuit 58' and to open another switching circuit 58" only when the drum is rotating at the main scanning speed. As will be understood from the description which will be given later, the above-mentioned switches are in the state as shown in FIG. 8 when the facsimile communication is over. Therefore, a capacitor 60 is charged when the drum is rotating at a low speed.

Upong detect of the notch 43a of the rotary shutter 43, the sensor 44 acts to open the switching circuit 44' thereby to turn the relay 59 off, so that the contact 59a is switched from the terminal 59' to the terminal 59" to break the driving circuit for the motor 53. Simultaneously, the capacitor 60 makes a discharge to effect a D-C braking on the motor 53 so that the drum 2 is stopped instantaneously. Since a constant positional relationship is preserved between the drum 2 and the rotary shutter 43, the drum is stopped at a constant position with an extremely small error. If the drum is rotated unintentionally out of the above-mentioned constant position due to a reason such as movement of the facsimile device or the like, after making a stop at the constant position, the state as shown in FIG. 8 is recovered because the shutter 43 closes the sensor 44 as a result of the rotation of the drum 2. This condition is maintained as long as the electric power supply to the device is continued.

Hereinafter, the operation for automatically attaching and detaching the sheet to and from the drum 2 will be described with specific reference to FIGS. 3, 4 and FIGS. 6 to 15.

Figure 9:
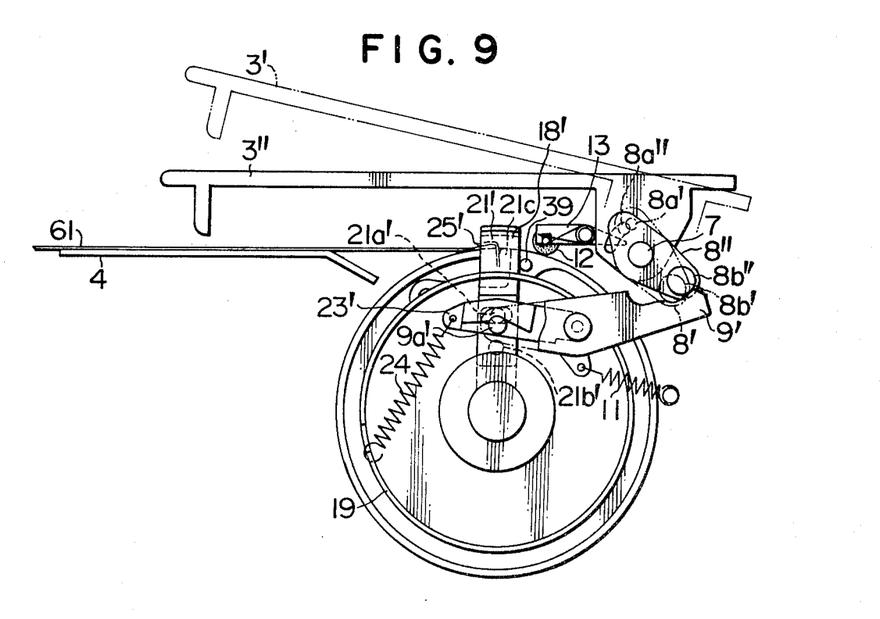
FIGS. 9 to 15 are illustrations of operation of the embodiment of the invention.
Figure 10:
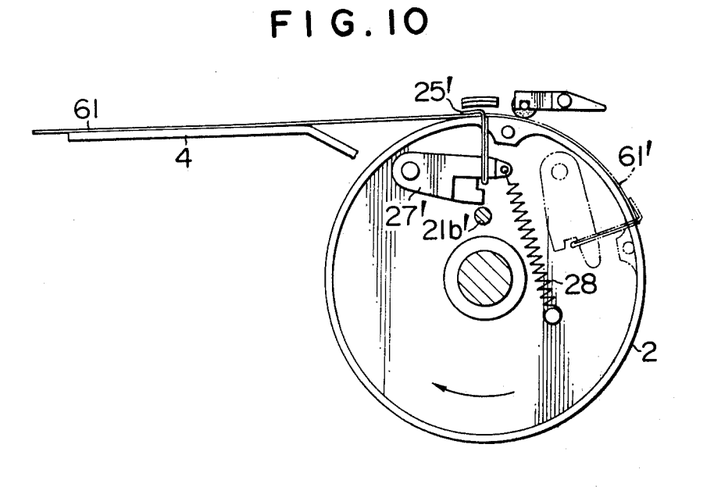

Referring first to FIGS. 3, 4, 9 and 10, a sheet 61 is placed by the facsimile operator on the table 4 with its leading end received by the gap 25a of the bar 25 for clamping the leading end. Then, the operator closes the drum cover 3. In the course of closing of the drum cover 3, the pin 8a takes a position denoted by a numeral 8a' when the drum cover is moved to the position denoted by a numeral 3', as shown in FIG. 9. Accordingly, the arm 8 is rotated to take the position 8' and the pin 8b is moved to a position 8a'. As a result of the movement of the pin 8b to the position 8b', the bar-actuating lever 9 is moved to a position 9' by the force exerted by the spring 11, so that the pin 9a is moved to a position 9a'. In consequence, the arm 23 is moved to a position 23' so that the pins 21a, 21b of the bracket 21 are moved to positions 21a' and 21b', respectively. The displaced pin 21b' then permits the spring 28 to move the arm 27 to the position denoted by a numeral 27', so that the bar 25 is moved to position denoted by a numeral 25' to clamp the leading end of the sheet 61. Meanwhile, the arm 23' causes a movement of the bar 18 to a position 18', through the action of the pin 21a' and the bracket 21'. However, since the pin 9a' retains the arm 23', the bar 18' is held still apart from the drum 2.

Then, as the drum cover 3 is moved to a full closed position 3", the pin 8a, the arm 8 and the pin 8b are moved further to the positions 8a", 8" and 8b". Since the shaft 7 makes an angular displacement by an angle equal to that of the arm 8 to the position 8", the members on the rightside wall 7 shown in FIG. 6 are all moved to the position shown in FIG. 11. Namely, the dog 30, the shutter 32, and the cam 29 are moved to positions 30', 32' and 29', respectively. The cam 29 in turn causes the drum stop lever 37 and the shutter 41 to positions 37', 41'. The rotation of the shaft 7 displaces the cam 45 on the leftside wall 5 shown in FIG. 7 to a position 45'. Since the axis 46a of the spring 46 has been moved beyond the dead point 47, the cam 45 is biased toward a position 45". However, the cam 45 is stopped at the position 45' because it is retained by the kicker lever 48.

Hereinafter, a description will be made as to the operation of sensors and control circuit in the course of the closing motion of the drum cover 3.

Figure 11:
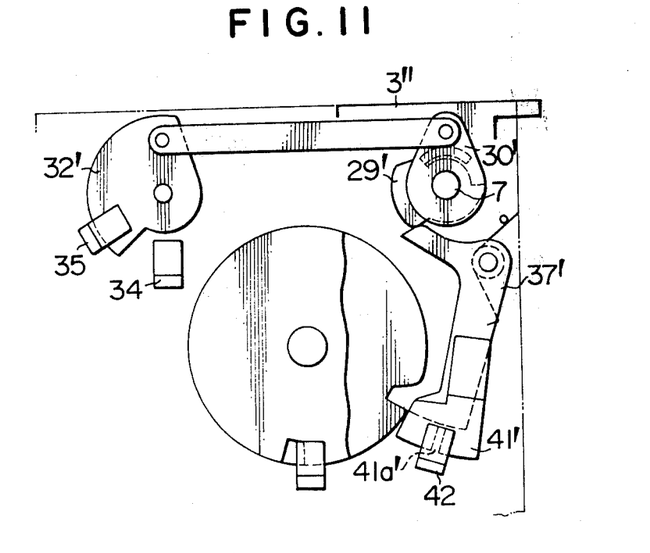

Referring to FIGS. 6 and 11, the sensor 35 is closed during the movement of the shutter 32 to a position 32'. More specifically, the sensor 35 is closed at a moment at which the drum cover 3 shown in FIG. 9 takes a position intermediate between the positions 3' and 3", i.e. when the arm 8 takes a position between the positions 8' and 8". When the shutter 41 takes the position 41', the notch 41a' of the latter acts to open the sensor 42. This opening of the sensor 42 is made after the closing of the sensor 35.

Figure 13:
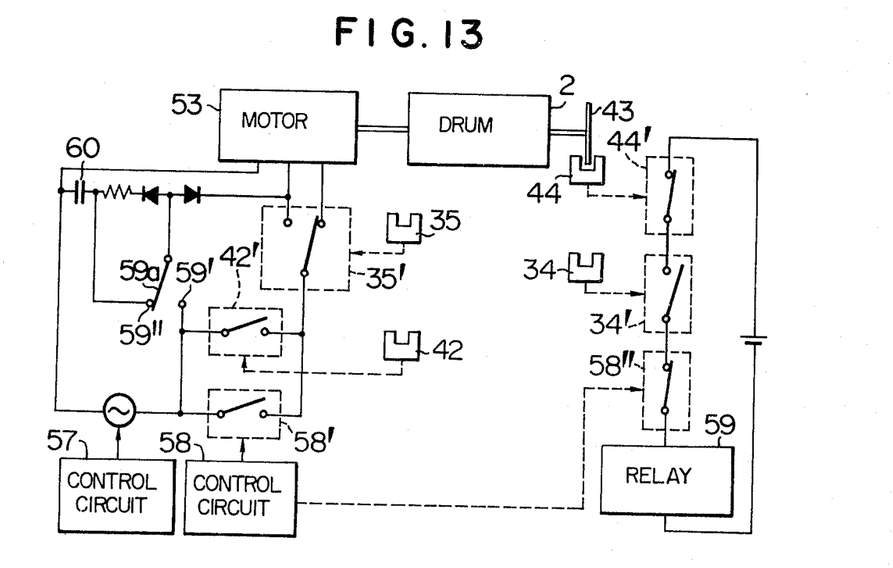

Referring now to FIG. 13 showing the state of operation of the sensors and control circuit, the connection for the forward rotation (direction of arrow 62 in FIG. 7) of the motor 53 is completed by the switching circuit 35' as a result of the closing of the sensor 35. As the sensor 42 is opened subsequently, the switching circuit 42' is closed to start the driving of the motor 53, which in turn causes the rotation of the drum 2 to initiate the winding of the sheet as denoted by 61' in FIG. 10 round the drum 2.

In this state, the retainer 19 is kept unmoved irrespective of the rotation of the drum 2, because the arm 23 in the position 23' is retained by the pin 9a, so that the bar 18 in the position 18' is kept ummoved together with the bracket 21 in the position 21'. As the drum 2 rotates further, the kicker arm 52 shown in FIG. 7 is rotated in the direction of the arrow to a position 52' to move the kicker lever 48 to a position 48' thereby to release the cam 45 in the position 45'. The cam 45 released from the kicker lever 48 is moved by the force of the spring 46 to a position 45" to hold the kicker lever 48 at a position 48".

Figure 12:
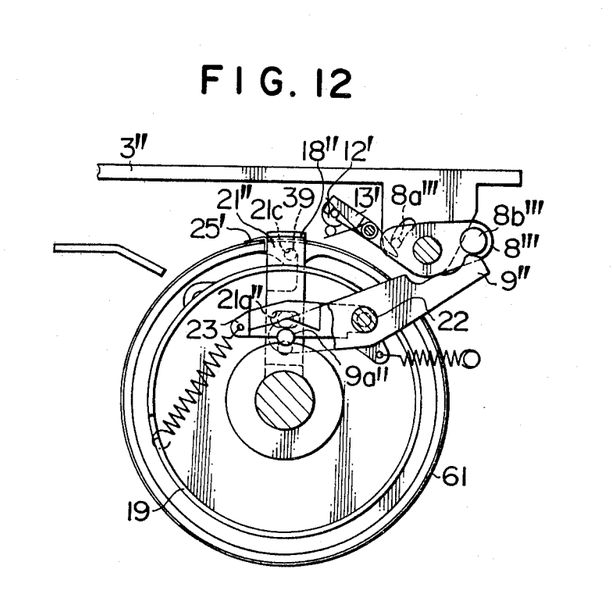

Referring now to FIGS. 9 and 12, the movement of the cam 45 to the position 45" (FIG. 7) in turn causes movements of the arm 8 and, accordingly, the pins 8a, 8b to positions 8'" and 8a'" through the rotation of the shaft 7. The pin 8a in turn drives the bracket 13 and the pinch rollers 12 to positions 13' and 12', respectively. Meanwhile, the pin 8b drives the bar-actuating lever 9 to a position 9" and, hence, the pin 9a to a position 9a'". Also, the arm 23" and the bracket 21 are moved to positions 23" and 21" so that the clamp bar 18 is lowred from the position 18' to a position 18" thereby to clamp the trailing end of the sheet 61. Simultaneously, since the pin 9a has released the arm 23, the retainer 19, the bracket 21 taking the position 21" and the bar 18 taking the position 18" are allowed to rotate together with the drum.

In this state, the pin 39 has been moved to the position shown in FIG. 12 to engage the groove 21c of the bracket 21 taking the position 21", so that a constant positional relationship is established between the bar 18 in the position 18" and the bar 25 taking the position 25'.

The movement of the cam 45 to the position 45" shown in FIG. 7 simultaneously causes a movement of the dog 30 from the position 30' to a position 30" which in turn drives the cam 29, the drum stopper 37, the shutter 41, the notch 41a and the shutter 32 from positions 29', 37', 41', 41a' and 32' to positions 29", 37", 41", 41a" and 32", respectively. Hereinafter, the description proceeds also with reference to FIG. 13.

During the operation stated above, the sensor 42 is closed to open the switching circuit 42' to stop the power supply to the motor 53. Subsequently, the sensor 34 is closed to permit the closing of the switching circuit 34'. The winding (attaching) of the sheet 61 round the drum 2 is thus completed. At this moment, the rotary shutter 43 is situated at a position (See FIG. 14) for opening the sensor 44, so that the switching circuit 44' is kept opened. Therefore, the relay 59 is held still in off state to leave the contact 59a on the terminal 59", so that the motor 53 is not driven.

Immediately thereafter, however, the inertia of rotation of the drum 2 rotates the shutter 43 in the direction of arrow 63 so that the sensor 44 is closed, which in turn causes the switching circuit 44' to close to turn the relay 59 on. This state is shown in FIG. 8. As a result, the aforementioned D-C braking circuit is activated and the rotary shutter 43 is stopped at the position shown in FIG. 14 after making a further one full rotation. Accordingly, the drum carrying the sheet is stopped at a position shown in FIG. 12 after making a rotation.

Figure 8:
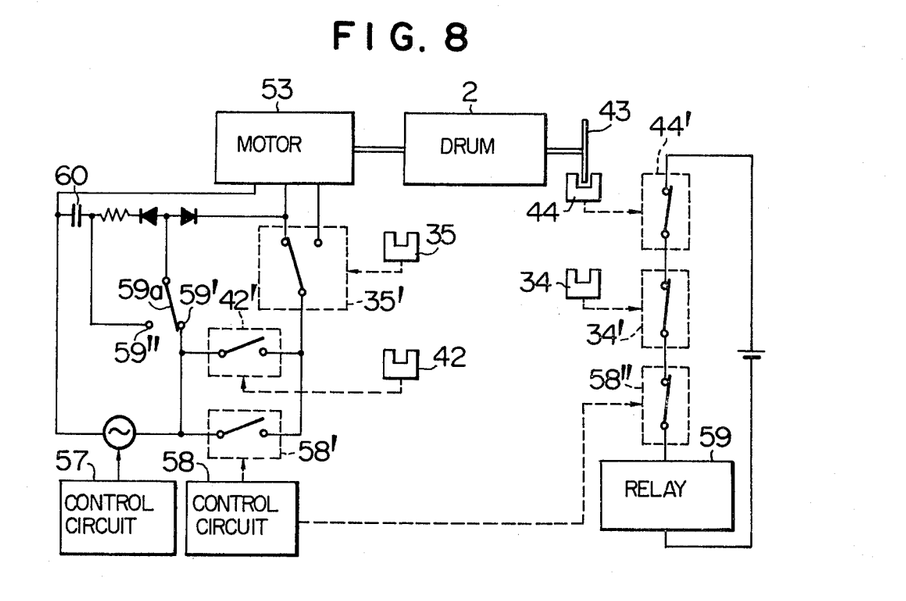
FIG. 8 is an illustration of interlocked operation of sensors and electric control circuit.

In ordinary use, the drum is then rotated at the main scanning speed by the operation of the control circuit as shown in FIG. 8, while a scanning base 64 shown in FIG. 3 is driven at a sub-scanning speed to make a facsimile communication.

As the facsimile communication is over, the D-C braking circuit is actuated as stated before, so that the drum 12 is stopped in the position shown in FIG. 12, i.e. in the state of completion of the winding, as well as other members.

Referring again to FIG. 14, as the drum cover is opened from the position 3" to the position 3, the shutter 32 is rotated clockwise from the position 32" together with the shaft 7 and the dog 30. This in turn causes the sensor 34 to open. Referring also to FIG. 8, the opening of the sensor 34 causes the switching circuit 34' to open, so that the relay 59 is turned off to open the D-C braking circuit. Subsequently, the sensor 35 is opened to make the switching circuit 35' complete the circuit for reversing the motor 53.

Meanwhile, the arm 8 and pins 8a, 8b which are taking the positions 8''', 8a''' and 8b''' as shown in FIG. 12 are rotated clockwise together with the shaft 7, so that the pinch roller 12 in the position 12' is pressed against the surface of the sheet 61 because the bracket 13 in the position 13' is released from the pin 8a taking the position 8a'''. Meanwhile, the bar-actuating lever 9 in the position 9" is pressed by the pin 8b taking the position 8b''' to rotate around the shaft 22 in the clockwise direction to cause the pin 9a in the position 9a''' to lift the arm 23 taking the position 23'''. Consequently, the bracket 21" is raised from the position 21" through the action of the pin 21a", thereby to disengage the pin 39 from the groove 21c. Simultaneously, the bar 18 is moved away from the position 18" on the drum surface to release the training end of the sheet 61.

Figure 14:
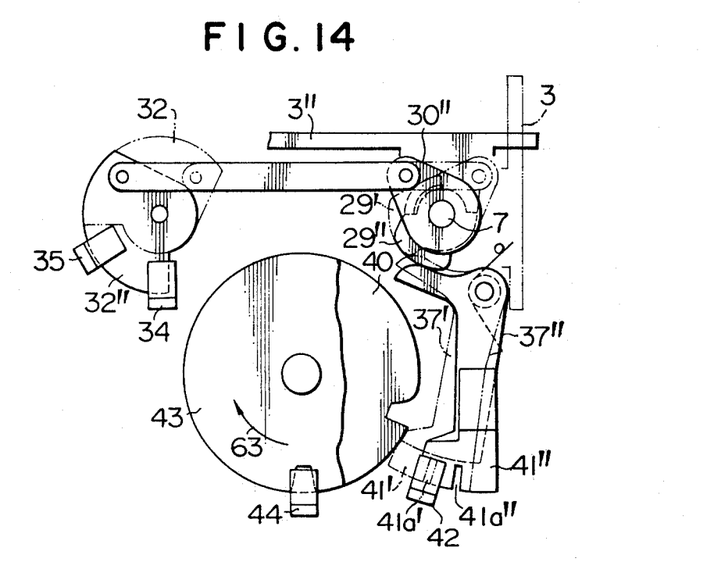
Figure 15:
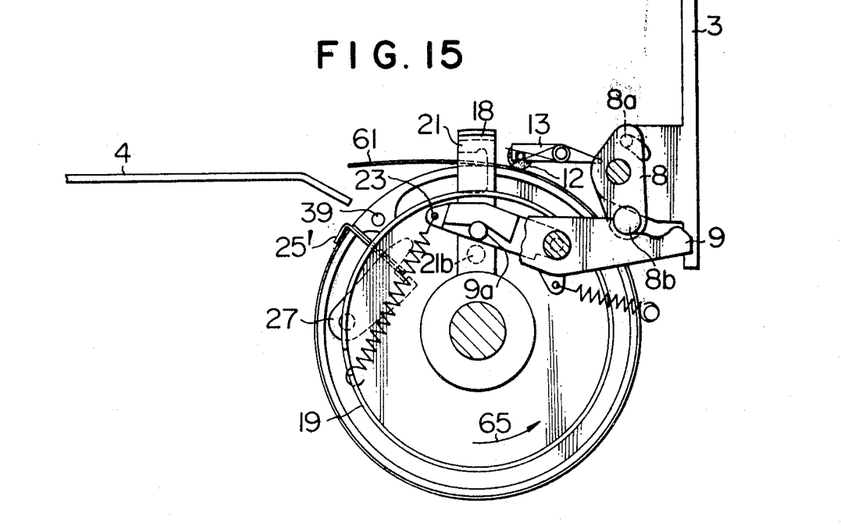

As the drum cover is fully opened, the abovementioned members take positions shown in FIG. 15. However, immediately before they are moved to the positions shown in FIG. 15, the cam 29 has been rotated from the position 29" shown in FIG. 14 to the position 29', so that the drum stopper lever 37" has been released from the cam 29. Consequently, the drum stop lever 37 resumes the position 37' to put its end in contact with the outer peripheral surface of the drum stop cam 40.

Further, the shutter 41 is returned from the position 42" to the position 42' so that the notch 41a, which has been moved also to the position 41a', permits the sensor 42 to open. Consequently, the switching circuit 42' shown in FIG. 8 is closed to start the motor 53 so that the drum 2 is rotated in the direction of the arrow 65 shown in FIG. 15 to commence the discharge of the sheet 61 onto the table 4.

In this state, since the pin 9a has already held the retainer 19 through the medium of the arm 23, the bar 18 is held in the illustrated position. At the same time, the cam 45 is returned from the position 45" to the original position 45. However, the kicker lever 48 is not directly moved from the position 48" to the original position 48, but is temporarily stopped at the intermediate position 48', because the kicker arm 52 takes the position 52' at a moment immediately before the commencement of the drum for discharging the sheet.

These members shown in FIG. 7 have nothing to do with the operation for discharging the sheet.

The drum stop cam 40 in the state shown in FIG. 14 rotates together with the drum 2 while the latter is rotating for discharging the sheet.

Referring also to FIG. 6, the drum stopper lever 37 is moved back from the position 37' to the original position 37 to bring its recess into engagement with the drum stop cam 40, just before the latter completes one full rotation, so that the drum stop cam 40 and, hence, the drum 2 stop to rotate. During this movement, the shutter 41 acts to close the sensor 42 on its way from the position 41' to the original position 41. As a result of the closing of the sensor 42, the switching circuit 42' shown in FIG. 8 is opened to stop the power supply to the motor 53. Also, the cam 29 is moved back from the position 29' to the original position 29. The pin 39 shown in FIG. 15 has reached the position shown in FIG. 3, when the drum stops to rotate. Also, the arm 27 is moved to ride the pin 21b before the drum stops to rotate so as to commence to open the bar 25'. When the drum stops to rotate, the bar 25 has been moved from the position 25' to the original position 25 to release the leading end of the sheet 61.

The discharge of the sheet is thus completed, and the sheet is returned to the position shown in FIG. 3. All members of the facsimile device have been reset to the state ready for the receipt of new sheet, when the sheet is returned to the position shown in FIG. 3.

As has been described, according to the invention, there is provided a drum-scanning type facsimile having a drum mounted rotatably, and a first and a second bars movable toward and away from the drum surface, the bars being adapted, when moved toward the drum surface, to cooperate with the drum surface in clamping therebetween the leading and trailing end of a sheet, characterized by comprising mechanical means and electric means adapted to operate the bars in response to the opening and closing motion of a manually operable drum cover, whereby the sheet placed at a predetermined position is automatically picked up and wound round the drum merely by a closing operation of the drum cover, and is automatically released from the drum merely by an opening operation of the drum cover.

It is therefore possible to automatically pick up the sheet from a predetermined position and to wound the same around the drum, and to release and return the sheet to the same predetermined position, by a simple manual operation for closing and opening the drum or the like member.

What is claimed is:

1. A facsimile device having a drum mounted rotatably, and a first and a second bars movable toward and away from the drum surface, said first and second bars being adapted, when moved toward said drum surface, to cooperate with said drum surface in clamping therebetween the leading and the trailing ends of a sheet, respectively, characterized by comprising mechanical means and electric means adapted to cooperate with each other in controlling the operation of said first and second bars in response to a manual opening and closing operation of a drum cover or the like means, whereby a sheet placed at a predetermined position is automatically picked up and wound round said drum merely by a manual closing operation of said drum cover or the like, and is automatically released and returned to said predetermined position merely by manual opening operation of the same.

2. A facsimile device having a drum mounted rotatably, and a first and a second bars movable toward and away from the drum surface, said first and second bars being adapted, when moved toward said drum surface, to cooperate with said drum surface in clamping therebetween the leading and the trailing ends of a sheet, respectively, characterized by comprising detecting means adapted to detect a rotational position of said drum as a first point and other rotational positions of said drum as a second position, said detecting means being adapted, upon detect of said first position, to open the circuit of a motor for driving said drum and to apply D-C braking over a predetermined period to stop said drum, and, upon detect of said second position when said drum is moved out of the stopping position, to complete said circuit of said motor to drive said drum, so as to detect said first position again to make said rotor stop at said predetermined position.

3. A facsimile device having a drum mounted rotatably, and a first and a second bars movable toward and away from the drum surface, said first and second bars being adapted, when moved toward said drum surface, to cooperate with said drum surface in clamping therebetween the leading and the trailing ends of a sheet, respectively, characterized by comprising: a mechanism through the action of which said first and second bars are moved toward said drum surface by a closing operation of a manually operable drum cover; a cam adapted to make a snapping action in response to the closing operation of said drum cover; a kicker lever adapted to retain said cam at an intermediate position in said snapping action, the interference between said cam and said kicker lever interrupting the operation of said mechanism to hold only said second bar at an intermediate position in its movement toward said drum surface; a kicker cam mounted to keep a constant positional relationship with said drum, said kicker cam being adapted to be rotated as said drum rotates to kick said kicker lever thereby to make the latter release said cam, whereby said mechanism, the movement of which has been interrupted, is actuated by said snapping action of the released cam to move said second bar to the clamping position.

* * * * *